United States Patent
Rapoport et al.

[11] Patent Number: 5,887,921
[45] Date of Patent: Mar. 30, 1999

[54] SHOVEL

[75] Inventors: Mitchell I. Rapoport, Woodstock; Gregory R. Becker, Red Hook, both of N.Y.

[73] Assignee: Kombi Garden Tool, Inc, Olivebridge, N.Y.

[21] Appl. No.: 959,806

[22] Filed: Oct. 29, 1997

[51] Int. Cl.⁶ ..................................................... A01B 1/02
[52] U.S. Cl. .................. 294/60; 294/49; 294/57
[58] Field of Search ............................ 294/49, 50.6, 53.5, 294/55, 57–60; 172/371, 378, 380; 254/131.5, 132

[56] References Cited

U.S. PATENT DOCUMENTS

| | | | |
|---|---|---|---|
| 332,132 | 12/1885 | Anthony | 294/60 |
| 754,543 | 3/1904 | Christiansen | 294/60 |
| 917,670 | 4/1909 | Shanks . | |
| 1,335,848 | 4/1920 | Miller | 294/60 |
| 1,423,775 | 7/1922 | Mundt | 274/60 |
| 1,513,179 | 10/1924 | Monica | 294/60 |
| 1,658,963 | 2/1928 | Bergquist | 294/60 |
| 2,047,485 | 7/1936 | McBrady | 294/57 |
| 3,020,077 | 2/1962 | Rokos | 294/49 |
| 4,281,866 | 8/1981 | Atcheson | 294/50.5 |
| 4,904,011 | 2/1990 | Hawk | 294/49 |
| 4,916,984 | 4/1990 | Albert | 76/113 |
| 5,188,340 | 2/1993 | Green | 254/132 |
| 5,401,071 | 3/1995 | Tummino et al. | 294/60 X |
| 5,520,429 | 5/1996 | Gregory | 294/49 |

FOREIGN PATENT DOCUMENTS

| | | |
|---|---|---|
| 577080 | 5/1933 | Germany . |
| P10633III45a | 10/1955 | Germany . |
| 18899 | 10/1899 | United Kingdom ..................... 294/60 |
| 2041203 | 9/1980 | United Kingdom . |

*Primary Examiner*—Johnny D. Cherry

[57] ABSTRACT

A shovel having a rotatable foot pedal at the top edge of the scoop on each side of the point where the handle joins the scoop. When rotated forward, when the pedal is pressed down, the point of the scoop is directed straight down. When the pedal is rotated back, when the pedal is pressed down, the point of the scoop is forced forward. In addition, detachable handles of various types may be interchanged and the scoop of the shovel may have different edge configurations, including various sized teeth in the edge of the scoop to assist in cutting roots and other material that the shovel might encounter.

11 Claims, 3 Drawing Sheets

SHOVEL

BACKGROUND OF THE INVENTION

1. Field of the Invention

This invention relates to a shovel and more particularly to a shovel which has a pedal, which can be positioned both forward and backward, mounted on the upper edge of the shovel on each side of the handle to direct the movement of the point of the scoop either forward when the pedal is positioned to the back of the scoop or straight down when the pedal is positioned forward. Alternate embodiments may include different scoops with edges having teeth of various shapes and having a detachable handle to permit the use of handles of different types.

2. Description of the Prior Art and Objects of the Invention

Shovels have been used for years. Various designs are known to exist, such as the pointed digging shovels and square ended shovels used for coal and picking up debris pushed with a broom onto the shovel. Shovels, as generally known, whether for digging or for other work, have a top edge. The handle joins the scoop or blade by being inserted into a handle tube affixed to the top edge of the blade or scoop. The handle tube is secured to the upper edge of the scoop generally midway between the two side edges of the scoop. The upper edge of the scoop serves as the point of placement of the foot of the person using the shovel to force the scoop of the shovel into the ground. The upper edges are normally not wide and often cause discomfort to the foot when the foot is pressed against the upper edge. The Gregory Patent, U.S. Pat. No. 5,520,429, provides wings with bent over portions which provide footrests. These footrests are, however, fixed and are not capable of being moved from one position to another. The configuration of the shovel taught by Gregory is for one type of digging where the shovel is directed generally horizontally. Other types of digging, such as digging as straight down as possible, would not be possible with the shovel taught by Gregory.

The Hawk Patent, U.S. Pat. No. 4,904,011 teaches a handle which is rotatable on an offset member. The scoop of the shovel taught by Hawk has tab portions which serve as a footrest but which, like those taught in Gregory, are fixed in place. According to Hawk, varying the position of the handle in relation to the blade, the blade can be directed straight down or forward, as desired.

The use of teeth on a shovel to aid in cutting into the ground is shown in the Rokos Patent, U.S. Pat. No. 3,020,077. The use of smaller cutting teeth on the side edges but toward the upper edge of the scoop are shown in the Green Patent, U.S. Pat. No. 5,188,340.

A shovel with a handle secured at a fixed angle to prevent rotation of the handle during operation, the scoop of which can be directed either generally straight down or which can directed more toward the horizontal and still provide strength and durability, as well as greater comfort for the foot pressing the shovel in its intended direction, would be a benefit. The use of various styles of edges on the side and point of the scoop would provide cutting qualities for different situations. The use of interchangeable handles permits the use of different handles with scoops of different styles.

Accordingly, it is an object of the present invention to provide a shovel which can be directed to penetrate nearly straight down and can also be directed to penetrate toward the horizontal.

Accordingly, it is a further object of present invention to provide a shovel which has a superior ability to cut material located in the ground.

Accordingly, it is a further object of the present invention to provide a shovel which can be used with various handles.

Accordingly, it is a further object of the present invention to provide a shovel which is durable.

Accordingly, it is a further object of the present invention to provide a shovel which is economical.

Accordingly, it is a further object of the present invention to provide a shovel which is versatile.

These and other objects and advantages of the present invention will become apparent to those of ordinary skill in the art as the description thereof proceeds.

SUMMARY OF THE INVENTION

A shovel with a front surface and a back surface is provided which has a rotatable pedal mounted on the top edge of the scoop on both sides of the handle. The pedal may be positioned so as to be over the front surface and may also be positioned so as to be over the back surface. The shovel may, in addition, be provided with a variety of cutting edges on the scoop and may also be provided with interchangeable handles.

DESCRIPTION OF THE DRAWINGS

The invention may be readily understood by referring to the accompanying drawings, in which:

FIG. 8.

DESCRIPTION OF THE PREFERRED EMBODIMENT

Figure 1:
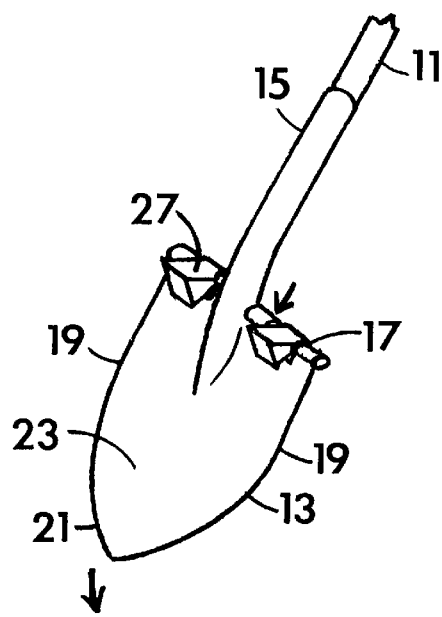
FIG. 1 is a sectional view showing the front surface of the scoop of the shovel with the handle tube extending from the top edge with pedal blocks located on both sides of the handle tube with the pedal blocks in the forward position.
Figure 2:
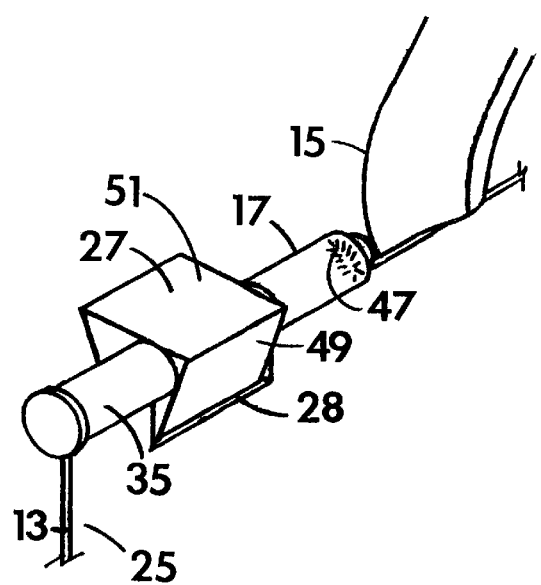
FIG. 2 is an enlarged pictorial view of a portion of the back surface of the scoop and the top edge and the handle tube showing the journals at the top edge in the journals and through an opening in the pedal block with the pedal block in the forward position.
Figure 3:
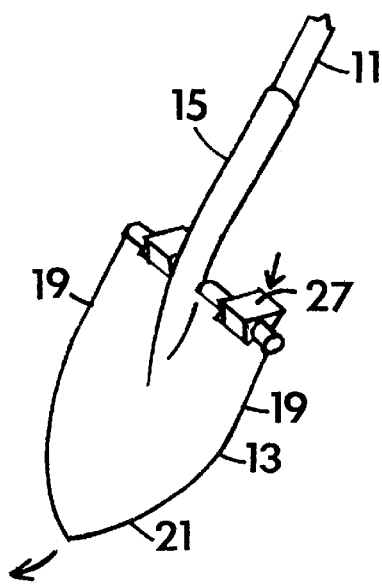
FIG. 3 is a pictorial view similar to FIG. 1 but with the pedal block positioned over the back surface of the scoop of the shovel.

The shovel, as best shown in FIG. 1 through FIG. 5, includes a handle 11 and a scoop 13. A handle tube 15 is rigidly secured to or formed with the scoop 13. The handle 11 is secured into the handle tube 15. The scoop 13 has a top edge 17, two side edges 19 and a bottom edge 21. The bottom edge 21, as shown in FIG. 1 and in FIG. 3, is pointed, as is customary in a shovel used for digging. The bottom edge 21, however, may be straight as is customary in shovels such as used for shoveling coal and sand.

The scoop 13 has a front surface 23 and a rear surface 25. The front surface 23, in one way or the other, forms a retainer or trough. The scoop 13 as shown in FIG. 1 and FIG. 3 has a front surface 23 which is concave and the back surface 25 is just the opposite or convex.

Figure 5:
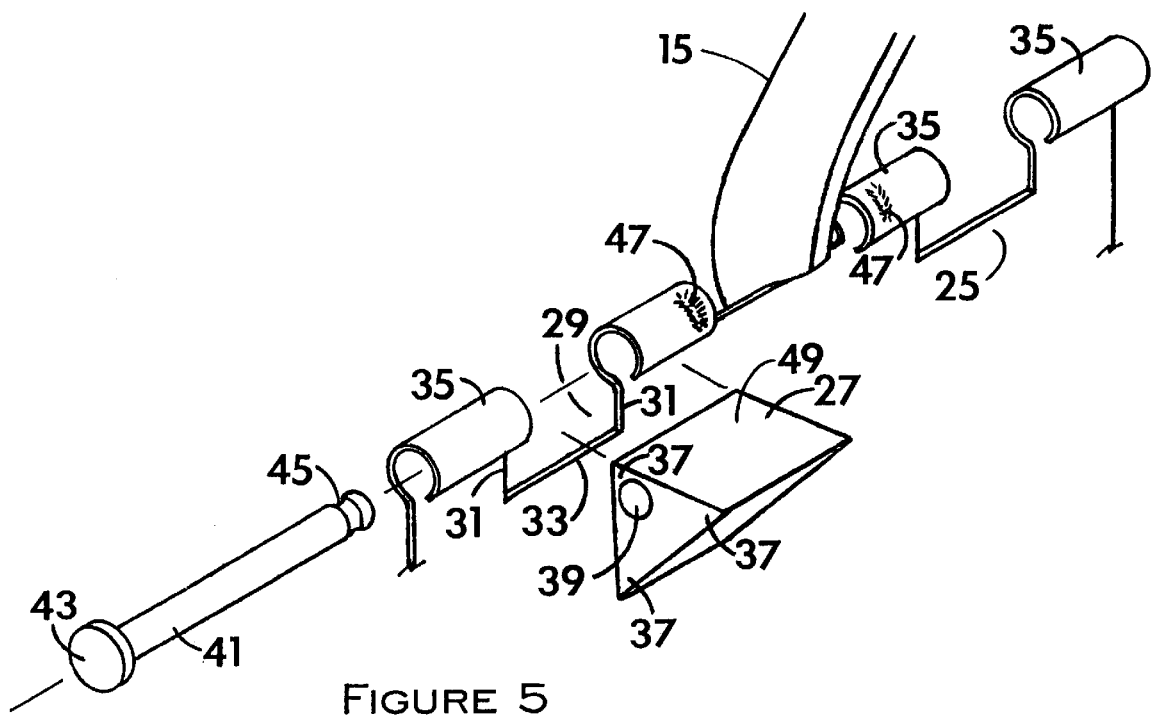
FIG. 5 is a pictorial assembly view showing the back surface of the scoop with journals at the top edge and a pedal block having an opening at an apex and a pin for placement in the journals and the opening.

Referring most particularly to FIG. 5, a pedal block 27 is mounted on the top edge 17 of the scoop 13, generally symmetrically on both sides of the handle tube 15. A notch 29, which is rectangular, is cut out of the top edge 17. The notch 29 has vertical edges 31 and a horizontal edge 33 which is generally parallel to the top edge 17. Each notch 29 is generally located between the handle tube 15 and its respective side edge 19. The top edge 17 of the scoop 13 on both sides of the indentation 29 is rolled to form journals 35. An alternative to rolling the top edge 17 would be to weld a tube to the top edge 17. With the journal 35 formed, the horizontal edge 33 which is parallel to the top edge 17 is substantially longer than the vertical edges 31 of the notch 29 beneath the journals 35.

Each pedal block 27 has a triangular cross section and therefore has three apexes 37 forming three edges 36. The length of the pedal block 27, which is the length of the three edges 36, is just slightly less than the length of the horizontal edge 33 or the distance between the two vertical edges 31. The pedal block 27 has an opening 39 which is cylindrical extending along its length and is generally located within one apex 37 with the edge 36 adjacent thereto and is aligned with the edge 36. The opening 39 in the pedal block 27 has a cross section generally the same as the cross section of the journals 35.

Figure 4:
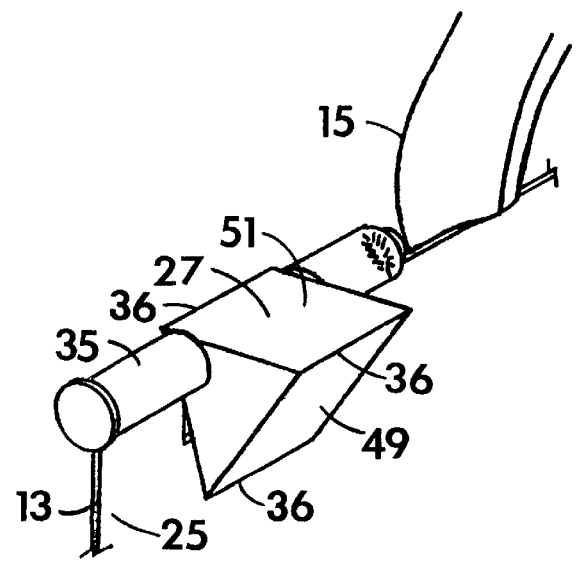
FIG. 4 is an enlarged pictorial view similar to FIG. 2 but with the pedal block rotated over the back surface of the scoop as shown in FIG. 3.

A pin 41 slides through the journals 35 and through the opening 39 in the pedal block 27. The pin 41 has a head 43 to prevent the pin 41 from sliding further into the journal 35 and at the end of the pin 41, opposite from the head, the pin 41 has a groove 45. As shown in FIG. 2, FIG. 4 and FIG. 5, a dent 47 is placed at the end of the journals 35 remote from the head 43 of the pin 41 which forms a bead (not shown) to hold the pin 41 inside the journal 35 in place. The groove 45 in the pin 41 engages the bead thereby preventing the pin 41 from sliding out of the journals 35 and the pedal block 27.

The pedal block 27 has two contact surfaces 49 and one intermediate surface 51. Each contact surface 49 serves as the platform on which the foot of the user is placed for one of the two working positions of the pedal block 27 and also serves to press against the scoop 13. When one contact surface 49 is used as a platform to step down on the other contact surface 49 is being pressed against the scoop 13.

The contact surfaces 49, which are rectangular, have a width which is greater than the length of the vertical edges 31 of the notch 29. In this way, as one contact surface 49 is rotated to the generally horizontal position to serve as a platform for the foot of the user, the other contact surface 49 engages the scoop 13. When the pedal block 27 is rotated to the back surface 25 of the scoop 13, the back surface 25 of the scoop 13 is contacted by a contact surface 49. When the pedal block 27 is rotated to be over the front surface 23 of the scoop, the front surface 23 of the scoop 13 is contacted by a contact surface 49. It should be noted that the opening 39 is located at the apex 37 where the two contact surfaces 49 join one another.

As shown in FIG. 1 and FIG. 3 by directional arrows, with the pedal block 27 rotated over the front surface 23 of the scoop 13, the scoop 13 is directed generally straight down when one of the pedal blocks 27 is forced downwardly. When the pedal block 27 is rotated to be over the back surface 25, the scoop 13 is directed forward to the horizontal by pressing down on a pedal block 27.

Figures 7, 8, 9:
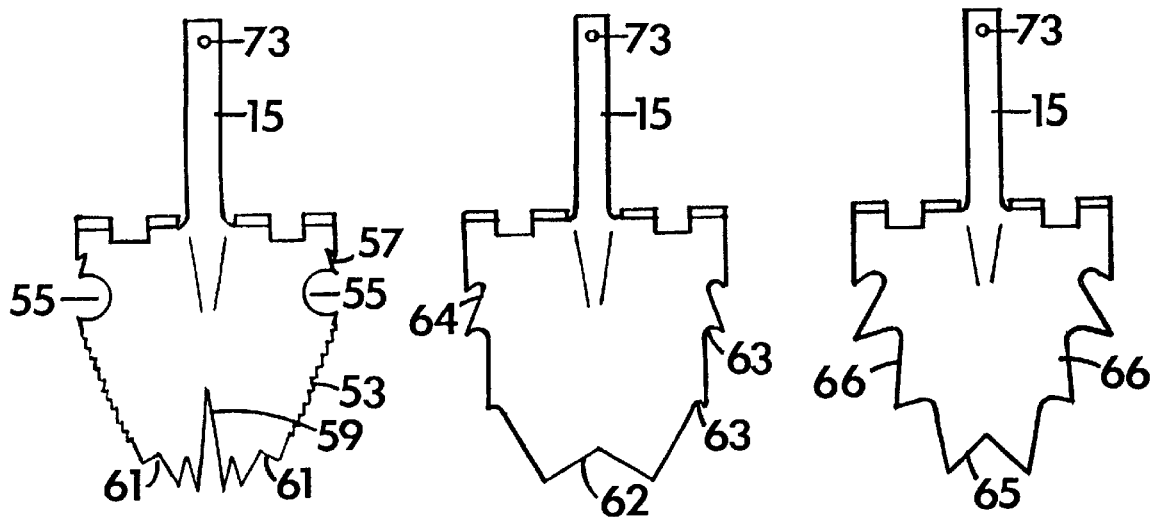
FIG. 7 is a front elevation of the front surface of the scoop without the pedal blocks but with saw tooth edges and root cutters along the edges of the scoop.
FIG. 8 is a front elevation similar to FIG. 7 but with different edge configurations than shown in FIG. 7.
FIG. 9 is a front elevation similar to FIG. 7 but with still further different edge configurations than shown in FIG. 7.

As best seen in FIG. 7 the scoop may be modified to provide superior piercing of the substance being dug. Particularly, such a modified scoop is valuable in cutting soil with roots present. The design of FIG. 7 has saw teeth 53 which are comparably fine along the side edges 19 and on the side edges above the saw teeth 53 a horizontal U-shaped cut out 55 for cutting large roots and a small inclined V-notch 57 above the U-notch. On the bottom edge 21, a deep V-shaped cutout 59 is formed as the center with two smaller V-grooves 61 on each side of the deep V-shaped cutout 59.

The design of FIG. 8 has a wide V-notch 62 at the center of the bottom edge 21 and two small hook-shaped notches 63 on the side edges 19 and an inclined U-shaped notch 64 toward the top edge 17.

Figure 10:
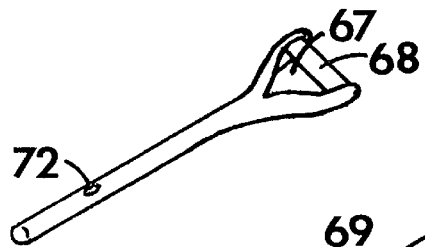
FIG. 10 is a pictorial view of a removable handle with a retractable ball and having a cross bar end.
Figure 11:
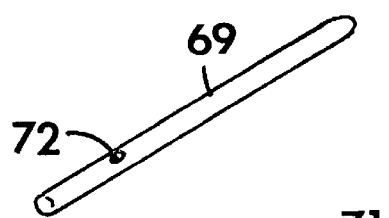
FIG. 11 is a pictorial view similar to FIG. 10 but with a straight handle.
Figure 12:
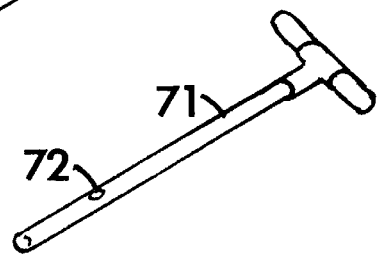
FIG. 12 is a pictorial view similar to FIG. 10 but with a handle having a T-end.

The design of FIG. 9 has a moderate V-shaped notch 65 at the center of the bottom edge 21 and three U-shaped notches 66 on each side of the scoop 13. FIG. 10 is a Y-shaped handle 67 with a cross bar 68. In FIG. 11 a straight handle 69 is shown. In FIG. 12 a T-handle 71 is shown.

Figure 6:
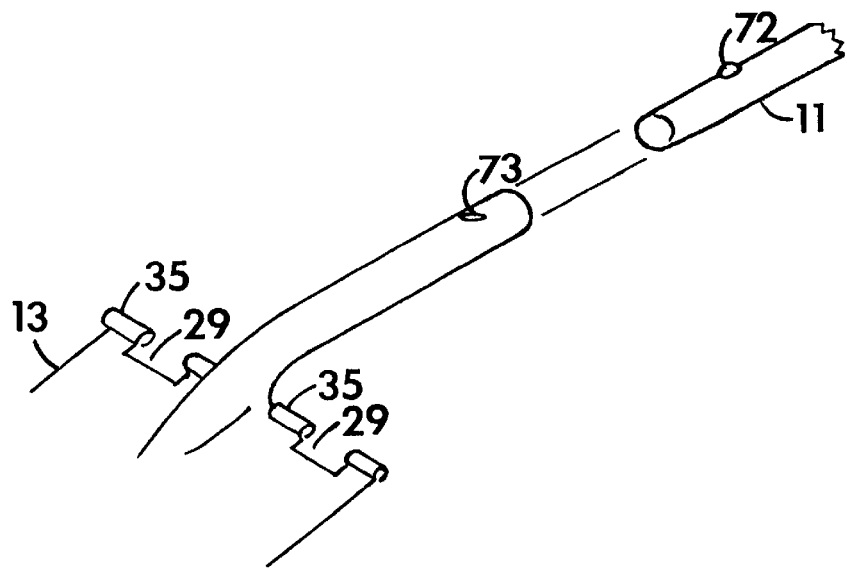
FIG. 6 is a pictorial assembly view of the upper portion of the front surface of the scoop without the pedal blocks but with the handle tube having an opening and a removable handle with a retractable ball to lock in the opening in the handle tube.
Figure 13:
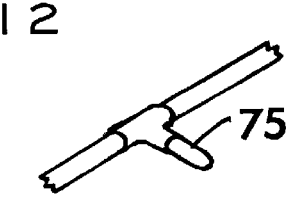
FIG. 13 is a pictorial view similar to FIG. 10 showing part of a handle with a midway side bar.

FIGS. 10, 11 & 12 show various handles, each with a retractable ball 72. As best seen in FIG. 6, the handle tube 15 has a hole or opening 73 in it. The handle 11 of any number of designs including the Y-handle 67, the straight handle 69 or the T-handle 71, can be retracted by depressing the retractable ball 72 and pulling out the handle 11 and then inserting a different handle 11. Similarly, any of the handles 11 may include a side handle 75 as shown in FIG. 13.

It is to be understood that the drawings and description matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

We claim:

1. A shovel comprising:

A scoop having a top edge, a bottom edge and two side edges and a front surface and a back surface;

a handle;

means for affixing the handle to the scoop secured to the scoop at the top edge generally midway between the two side edges;

a pair of pedal means; and means for mounting the pair of pedal means with one pedal means on each side of the means for affixing the handle to the scoop and for rotating the pedal means over the front surface of the scoop and over the back surface.

2. A shovel according to claim 1 wherein the handle includes a locking means.

3. A shovel according to claim 1 wherein the side edges of the scoop include saw teeth.

4. A shovel according to claim 1 wherein the bottom edge of the scoop has a V-shaped groove.

5. A shovel according to claim 1 wherein the pedal means includes a pedal block, the pedal block having a triangular cross section.

6. A shovel according to claim 1 wherein the means for mounting and rotating the pedal means includes journals at the top edge of the scoop.

7. A shovel according to claim 1 wherein:

the pedal means has an opening through it; and the means for mounting and rotating the pedal means includes journals at the top edge of the scoop and a pin is located in the journals and in the opening in the pedal means.

8. A shovel according to claim 1 wherein:

the pedal means includes a pedal block, the pedal block having a triangular cross section with three apexes, and having two contact surfaces and an intermediate surface, the contact surfaces and the intermediate surface being rectangular, an opening being located at the apex between the two contact surfaces.

9. A shovel according to claim 1 wherein the means for mounting and rotating the pedal means includes journals at the top edge of the scoop and a pin located in the journals and in the pedal means.

10. A shovel comprising:

a scoop having a top edge, a bottom edge and two side edges and a front surface and a back surface;

a handle tube secured to the scoop at the top edge generally midway between the two side edges, the top edge of the scoop being notched generally symmetrically on both sides of the handle tube, both notches being rectangular and having a horizontal edge generally aligned with the top edge and two vertical edges, the vertical edges being shorter than the horizontal edge;

a handle mounted in the handle tube;

journals mounted on the top edge of the scoop, each journal being generally aligned with the vertical edge of the notches;

a pair of pedal blocks each having a triangular cross section with three apexes and having two contact surfaces and an intermediate surface, the contact surfaces and the intermediate surface being rectangular, an opening being located at the apex between the two contact surfaces; and a pair of pins each located in the journals and the opening in a pedal block.

11. A shovel according to claim 10 wherein the handle includes a retractable ball and the handle tube includes a hole to receive the retractable ball.

\* \* \* \* \*